May 10, 1938. R. HEAD 2,116,892
AUTOMATIC GEAR SELECTOR AND SHIFT
Original Filed July 10, 1934 2 Sheets-Sheet 1

INVENTOR
ROBERT HEAD
BY
Prindle Bean & Mann
ATTORNEYS

May 10, 1938.   R. HEAD   2,116,892

AUTOMATIC GEAR SELECTOR AND SHIFT

Original Filed July 10, 1934   2 Sheets-Sheet 2

INVENTOR
ROBERT HEAD
BY Prindle, Bean & Mann
ATTORNEYS

Patented May 10, 1938

2,116,892

UNITED STATES PATENT OFFICE 2,116,892

AUTOMATIC GEAR SELECTOR AND SHIFT

Robert Head, Yonkers, N. Y.

Application July 10, 1934, Serial No. 734,482
Renewed September 22, 1937

9 Claims. (Cl. 74—334)

My present invention relates to an automatic gear selector and shift for automobiles. It does away with the usual hand lever for effecting the gear shifts and simplifies automobile operation by combining the gear shift control with the clutch operating means so that the operation of the clutch automatically effects the gear shifts. In addition the device embodies the feature that the driver of the car can manually vary the usual order of the shifts at will without withdrawing the device from the general control of the clutch operating means. The device is adapted to be applied as an attachment to the standard transmission but of course is not limited to use with the standard transmission.

I will now describe the preferred embodiment of my invention shown in the accompanying drawings, it being understood that this embodiment is to be taken as illustrative and not as limiting the invention thereto. On the contrary the illustrative embodiment may be changed or modified within the scope and spirit of the invention.

Figures 1, 1A:
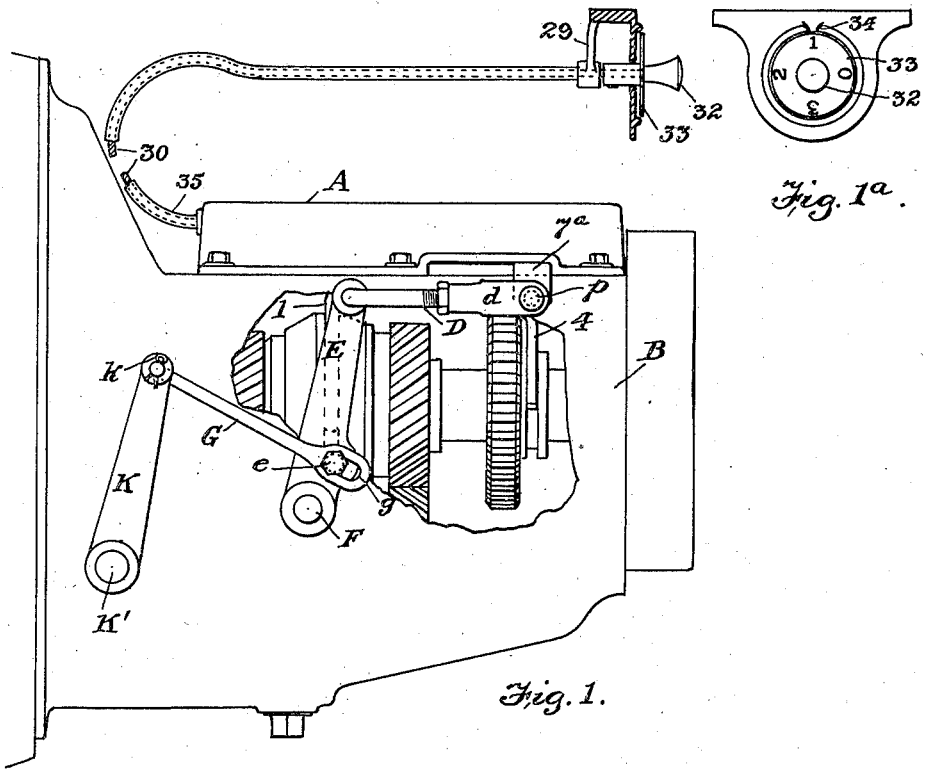
Fig. 1 is a side view of the housing B of a well known standard automobile gear transmission partly broken away showing gears of the transmission and the gear-shifting forks depending from my automatic gear selector and shift housed in the casing A; said figure further showing the linkage connecting my device with the standard clutch release lever K for operation therewith.
Fig. 1A is a face view of the indicator shown adjacently in Fig. 1.

In the drawings, A designates the casing of my device applied to a standard transmission, the housing of which is designated B. K is the standard clutch-release lever or crank-arm on shaft K' projecting through the side of the transmission housing B, said arm K swinging forward, namely toward the left in Fig. 1, with each pushing-out of the clutch and swinging backward with each letting-in of the clutch. This arm K serves to connect my device with the standard or ordinary clutch operating means of the car for operation thereby as will be described later on.

1 and 4 are the standard forks extending down into the transmission for shifting the gears, these forks being respectively on the left and right hand side of the transmission looking from the back of the car towards the front, the front being supposedly at the left in all of the main figures of the drawings. The necks of these forks 1 and 4 are integral respectively with the sleeves 2 and 5 of my device which in turn are slidable respectively on parallel stationary rods 3 and 6 which are fixedly mounted in the casing A and extend fore and aft thereof. Each sleeve 2 and 5 has an upwardly extending nub 2' and 5' respectively, against which pawls P1, P2, P3 and Pr (to be described later) selectively operate and push the sleeves 2 and 5 before them and the forks 1 and 4 to effect the gear shifts.

Figure 4:
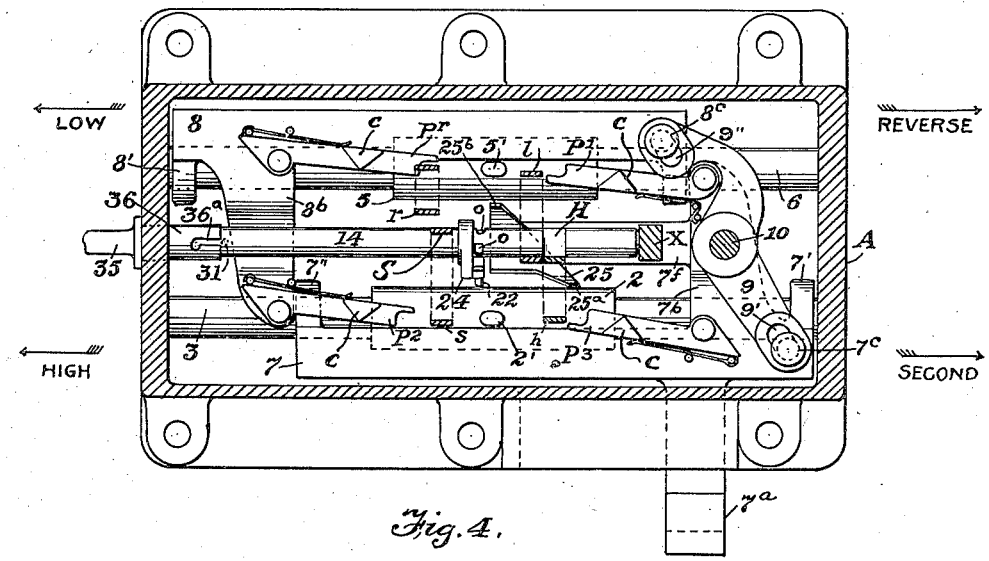
Fig. 4 is a horizontal section on the line 2—2 of Fig. 3 looking down.

The device being illustrated with the standard transmission, it will be understood that the gear shift fork 4 on the sleeve 5 when pushed forward, that is, towards the left in Fig. 4 shifts the gears into first speed or low; and when pushed rearwardly shifts the gears into reverse. The fork 1 on sleeve 2 pushed rearwardly shifts the gears into second speed and pushed forward shifts them into high. These designations, high, low, etc. with directional arrows have been placed at the corners of Fig. 4 for convenient reference. Proceeding now with the description of the device, 7 and 8 are two slides supported by the previously referred to fixed rods 3 and 6 respectively. For this purpose the slide 7 has eyes 7' and 7'' at its ends slidably receiving through them the rod 3. The other slide 8 similarly has eyes 8' and 8'' slidably receiving its supporting rod 6. These slides 7 and 8 are connected for moving in unison but in opposite directions by the link 9 swinging on a stationary center pin 10 projecting down from the top of the casing 8, said link having slotted ends receiving pins 7c and 8c on the rear portions of the slides.

The slides 7 and 8 carry the previously referred to pawls P1, P2, P3 and Pr, and these are selectively adjustable, by means to be described, to engage or not to engage the nubs 2' and 5' on the previously described gear shifters 2 and 5. It will be seen that each slide has two of these pawls pivoted to the top of the slide at its ends. Each pawl is provided with a spring mounting which normally yieldingly positions the pawl with its free end directed toward the nub 2' or 5' of its slide. Each pawl is provided with a cam c which as will be later described cooperates with selective means which determines whether or not the given pawl is to be cammed out of its normal position so that it does not engage the nub 2' or 5' when the pawl is carried along with its supporting slide 7 or 8.

The slides 7 and 8 are operated synchronously with the clutch by means of connections as follows: The slide 7 has an arm 7a extending laterally through a slot formed between the flanged portion of casing A and the top of the transmission housing B. The clevis d, Fig. 1, of the link D is pivoted to the arm 7a by the clevis pin p. The opposite end of link D is bent at right angles and passes through a hole in the upper end of the lever E and is secured in place by a cotter pin not shown. The lower end of lever E is mounted for pivotal movement on a stationary stud F, which may be directly or indirectly secured to the side of the housing B. The linkage is completed by the connecting rod G which has a slot g at one end, engaging the stud e mounted on the lever E. The opposite end of the connecting rod G is bent at right angles and is received through the hole in the upper end of the lever K and is there held in place by the cotter pin k.

Thus when the lever K moves forward with the pushing out of the clutch, namely toward the left in Fig. 1, it will through the linkage just described move the arm 7a forward and said arm will carry with it the slide 7, Fig. 4. The slot g in the rod G is provided, and made long enough, so that there will be no forward movement of the arm 7a and slide 7 until the clutch release lever K has been moved far enough by the clutch pedal, not shown, to release the clutch.

Figure 2:
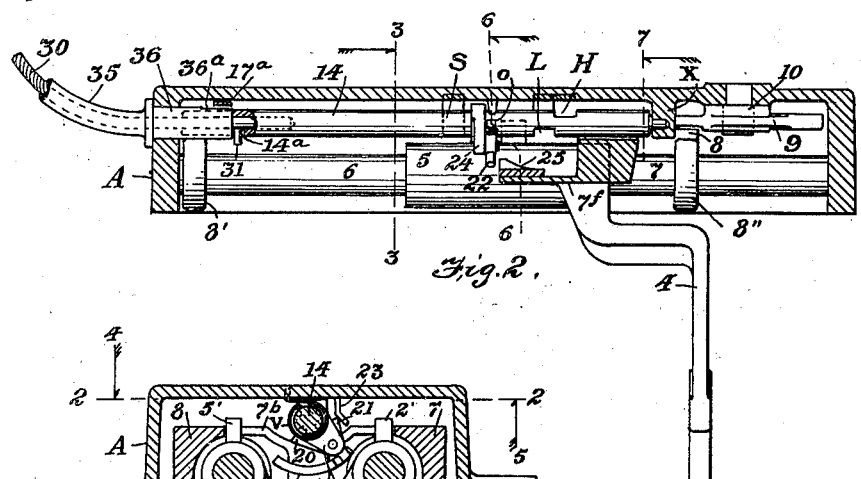
Fig. 2 is a longitudinal mid-section partly in elevation of the device.

The pawls P1, P2 and P3, when caused to push endwise against the nubs 2' and 5' of the gear shifters by the reciprocation of the slides 7 and 8 synchronously with the pushing out of the clutch, serve to shift the gears as follows: pawl P1 to low, P2 to second speed and P3 to high. This they do depending upon the selective operation of said pawls by mechanism next to be described. This comprises a shaft 14 having its forward end rotatably supported within the bearing sleeve 36 and having its rear end supported in a bearing formed in a lug X projecting down from the top of the casing A. This shaft is grooved or otherwise suitably differentiated at L, S and H from the body of the shaft, said grooves or differentiations preferably forming flatted portions L, S and H which successively are at right angles to one another so that they would form three sides of a square, if they were all in the same zone, which they are not; but are located at different zones along the shaft as shown for example in Fig. 2.

U-shaped members l, s and h, cooperate with the aforesaid flats L, S and H respectively and are severally slidably supported on the underside of the top of the casing A and are individually spring-pressed so that one leg of the given U-member recesses into the flat in the shaft 14 to which it is juxtaposed, whenever that flat is presented to it by the rotary adjustment of the shaft.

The other leg of each slidable U-member l, s and h cooperates with the cam c on the related pawls P1, P2 and P3. The arrangement is such in the illustrative device that the normal position of the particular pawl wherein it is operative to contact its nub 2' or 5' to shift the gears is not disturbed by the related U-member when it is in the related recess L, S or H in the shaft 14; but the shaft positions any U-members which are not in their recesses so that they are in the path of the cams c with the result that said pawls are deflected out of their normal position so that they miss the nubs 2' and 5' on the gear shifters when the pawls are carried along by the slides 7 and 8.

It will be seen from the foregoing that the shaft 14 must be rotated in 90° steps to make the flats L, S and H successively operative through the U-members l, s and h, and the pawls P1, P2 and P3 to effect the various gear shifts, low, second and high.

Figure 3:
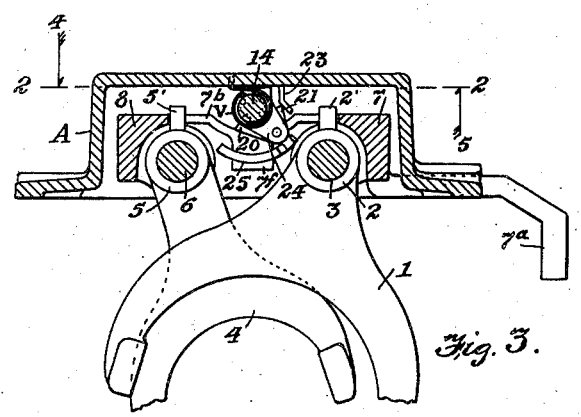
Fig. 3 is a transverse section on the line 3—3 in Fig. 2 looking in the direction of the arrow.
Figures 6, 7:
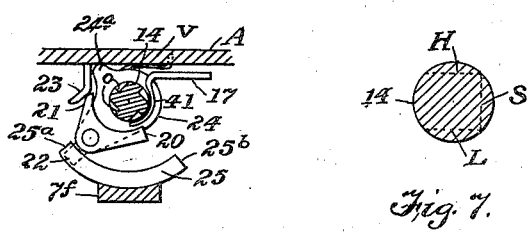
Fig. 6 is a detail view of the pawl and ratchet and of the operating cam for giving step-by-step rotation to the shaft 14, said view being taken on the line 6—6 in Fig. 2 looking in the direction of the arrow.
Fig. 7 is an enlarged cross section on the line 7—7 in Fig. 2 looking in the direction of the arrow with the flats H, S and L dotted in to show their relative positions.

The means for giving step by step rotation to the shaft 14 comprises a ratchet 20 pivoted to a ratchet arm 24 mounted on the shaft 14 with the shaft freely rotatable therein. Successive vibrations of the ratchet arm causes the ratchet to engage successively the four ratchet teeth o spaced 90° apart and rotate the shaft 90° at a time in counterclockwise direction in Fig. 6. A spring V yieldingly restores the ratchet arm 24 to its normal position shown in Fig. 3 after each partial rotation of the shaft, a projection 24a on the ratchet arm striking against the top of the casing A. At this time the leg 21 of the ratchet 20, Fig. 6 bears against the fixed abutment 23 and holds the ratchet 20 clear of the ratchet teeth o leaving the shaft 14 free to be rotated in either direction manually by knob 32 subsequently described.

The means for operating the ratchet mechanism to give the shaft said step-by-step 90° rotation during each letting-in of the clutch is as follows: A cam 25 is mounted on an extension 7f (Fig. 4) of the arm 7b of the slide 7. This cam 25 is concentric with the shaft 14, (Fig. 4) and is moved lengthwise thereof by the slide 7. When the slide 7 is moved forwardly, that is, towards the left in Fig. 4, the nose 25a of the cam contacts with the elbow 22 of the ratchet 20, presses it aside clockwise in Fig. 6 and then passes by and to the left of it in Fig. 4. The spring V returns the ratchet 20 to its normal position shown in Figs. 3 and 6 against the stop 23. The slide 7 and the cam 25 then make their return stroke, namely toward the right in Fig. 4, due to the letting in of the clutch. The spiral edge of cam 25 thereupon engages the elbow 22 of the ratchet beginning at the nose 25a of the cam and ending at its tail 25b. The result is that the ratchet arm 24 is rocked anti-clockwise in Fig. 6 about the shaft 14. At the beginning of this movement, the ratchet 20 is also rocked so as to engage one of the ratchet teeth o in the shaft. The continuing movement of the ratchet rotates the shaft 14 until the tail 25b of the cam disengages itself from the elbow 22 of the ratchet whereupon the ratchet and its arm spring back to their normal position, Fig. 6. Meanwhile the shaft 14 has been rotated 90° anti-clockwise and remains in that position until the next time the slide 7 is carried forwardly by pressing down the clutch pedal (not shown) and then has been carried rearwardly by the release of the clutch pedal. In that way each release of the clutch pedal, namely each letting in of the clutch, imparts a 90° anti-clockwise rotation to the shaft.

Referring to the foregoing, it will be understood that the gear shifters 2 and 5 stay where left, whether in their low, second, high or neutral positions. The drawings conveniently show them in neutral.

Each time after the clutch has been pushed out and during the first part of the remaining movement of the arm K (Fig. 1) in the push-out direction and during the accompanying movement of the slides 7 and 8 and of the pawls P1, P2, P3, some one of said pawls acts on its gear shifter 2 or 5 to shift the gears in the transmission into neutral. This is true regardless of how the various U-members l, s, h happen to be set, because these members cannot deflect these pawls until the pawls have moved far enough to bring their cams c adjacent the U-members. For this reason it will be noted that the cams c are located on the pawls well away from their free ends, namely on the middle portion thereof.

The last part of the clutch push-out movement and of the movement of the slides due thereto begins when the cams c on the pawls reach the U-members. Thereupon depending upon their adjustment, said U-members allow one of the pawls to remain operative to push the related gear shifter 2 or 5 and effect the shift in the gears but they render the other pawls inoperative for the time being by camming them out of line with the nubs 2 or 5 on the gear shifters, or they may cam all of the pawls P1, P2, P3 out of alignment as is the case when the transmission is left in neutral.

In brief, the last part of the clutch push-out movement and of the corresponding movement of the slides 7 and 8 shifts the gears to either low, second, high or neutral as the case may be, depending on the particular selective adjustment of the pawls P1, P2, P3.

Each letting in of the clutch has two effects: First it allows the gear shift, effected by the pushing out of the clutch, to drive the car at that speed; and secondly it operates the step by step mechanism so that it is all set and ready to adjust the pawls to effect the next gear shift, as soon as the driver again pushes out the clutch.

Specifically the drawings show the U-member s in its shaft groove S and out of the way of the cam c on the pawl P2 of the slide 8. This pawl P2 is therefore ready to strike the nub 2' and shove the shifter 2 to the right in Fig. 4 to shift the gears to second. This it does on the push out stroke of the clutch which moves the slide 8 to the right in Fig. 4. Meanwhile the other pawls P1 and P3 are cammed aside and rendered inoperative by their U-members l and h respectively, because the shaft grooves L and H are not presented to these members at this time.

When the clutch is let in, the car will go forward in second speed due to the aforesaid gear shift. This same letting in of the clutch will also carry the other slide 7 from the left to the right in Fig. 4 and with it the cam 25 which will act as heretofore described on the ratchet mechanism 20—24 to step the shaft 14 through an angle of 90°. This will give a different presentation of the shaft recesses or flats L, S and H to the related U-members and will readjust said members so that pawls P1 and P2 will be cammed out of line with the gear shifting nubs 2' and 5' but will leave pawl P3 in line with the nub 2' and operative to shift the transmission to high when the driver next pushes out the clutch.

I will now describe an automatic indicator usable to indicate to the driver at all times the status of the transmission. A knob 32, with rigidly attached surrounding dial 33 bearing digits 0, 1, 2 and 3, is connected by a flexible shaft 30 with the already described shaft 14 to partake of the step by step rotary adjustments and vice versa on occasion to impart rotary adjustment thereto when the knob 32 is manually twisted. For this purpose the knob and the attached end of the flexible shaft are supported in a suitable bearing 29, etc., on the dash or elsewhere convenient for the driver to see the dial and to operate the knob. The other end of the flexible shaft 30 is operatively supported in a bearing sleeve 36 which extends through the end wall of the casing A and is supported thereby. The flexible shaft is sheathed in a relatively stationary tube 35, the ends of said tube being anchored at the bearings 29 and 36 whereby said tube and the contained shaft 30 not only serves as a flexible shaft but also as a Bowden wire device for a purpose hereinafter explained. The end of the flexible shaft beyond the bearing 36, Fig. 2, extends freely into a hollow bore in the end of the shaft 14. The wall of the shaft 14 surrounding this bore is lengthwise slotted from its mouth at 14a to receive a pin 31 on the flexible shaft 30 whereby the two shafts are coupled for rotation together. It will be understood that the flexible shaft will be of any well known construction or make up which will transmit rotary adjustment from one end to the other accurately and without lost motion.

Because the flexible shaft causes the dial 33 to rotate with the shaft 14, it keeps the driver constantly informed as to the status of the transmission. Thus the dial may be set on the shaft so that the digits when they respectively register with the stationary pointer 34 may have the following significance:—The digit 1 that the low gears are in mesh, 2 that the second speed gears are in mesh, 3 that the transmission is in high, and 0 that it is in neutral. Another way is to set the dial so that the numerals indicate the shifts as they are set up on the step-by-step pawl selective mechanism before translating them into the transmission.

The hand controlled knob 32 and the flexible shaft connection with the shaft 14 of the step by step mechanism also enables the driver to operate said mechanism at will to bring any gear shift into action by adjusting the dial 33 relatively to the pointer 34 to the desired gear shift indication; and then operating the clutch whenever the driver is ready to make the indicated shift. Thus if in taking a hill on high, it be necessary to drop back to second, the driver will adjust the knob 32 and dial 33 from 3 at the pointer 34 to 2. This will automatically adjust the shaft 14 of the step by step mechanism so that the recess S of the shaft will be presented to its U-member s as in Fig. 4, whereupon the shift to second is automatically made by the driver pushing out the clutch which makes the pawl P2 on slide 8 push the gear shifter 2 to the right in Fig. 4 and shift the gears to second speed. Letting in the clutch then causes the car to proceed in second speed. It will be noted that the foregoing adjustment by the knob 32 does not take the device out of the general control of the clutch operating means because as soon as the car picks up enough speed to go into high, the shift to high will be automatically made merely by the driver again pushing out and letting in the clutch.

The pawl Pr has been referred to as operating to shift the transmission gears into reverse. The knob and flexible shaft participate in rendering this pawl Pr operative for this purpose as also does the mechanism shown in Fig. 5. The latter comprises slide 17 guided by stationary studs 19 and 19' on the underside of the top of the casing A located in the slots 17' and 17'' in the slide. A spring 18 retracts the slide 17 to the right into its normal position shown in Fig. 5. A U-member r freely straddles the slide 17 and is supported on an arm 16 which pivots about the fixed pin 19.

The depending legs of this U-member r are seen in horizontal section in Fig. 4. In both Figures 4 and 5, the U-member r is shown in its normal position wherein it interferes with the pawl Pr and cams it out of line with the nub 5' and prevents the pawl from operating the gear shifter 5 and the gears into reverse.

Figure 5:
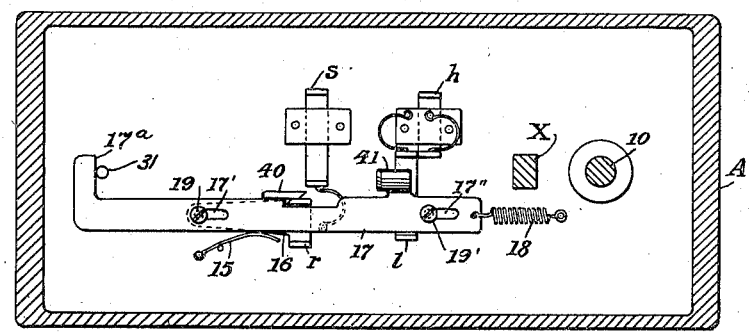
Fig. 5 is a horizontal section on the line 2—2 in Fig. 3 looking up and showing primarily only the mechanism mounted on the underside of the top of the casing, said mechanism serving to effect the shift of the transmission into reverse.

A spring 15 presses against the arm 16 and would carry the right hand leg of the U-member r out of the path of the cam on the pawl Pr (compare Fig. 5 with Fig. 4) were it not for the beveled lip 40 formed on the slide 17 and which normally engages the left leg of the U-member r as in Fig. 5. However, as soon as the slide 17 is drawn forwardly, the lip 40 slides away from the U-member and frees it to the action of the spring 15 so that the U-member is no longer in the path of the cam on the pawl Pr and therefore said pawl becomes effective to shift the gears into reverse, which it does on the next push out stroke of the clutch operating means.

The means for pulling the slide 17 forwardly to render the pawl Pr effective as aforesaid and for permitting the shift into reverse only when the gears are in neutral will now be described.

The slide 17 has a right-angle extension 17a at its forward end. The previously described pin 31 which it will be remembered normally couples the flexible shaft to the shaft 14 is located in back of said extension 17a only when 0 on the indicator is at the pointer 34 and the gears are in neutral.

The bearing sleeve 36 for the far end of the flexible shaft (Figs. 1 and 4) has its wall slotted at 36a on its upper side so as to receive the aforesaid pin 31 on the flexible shaft when the pin extends vertically upward, which as just explained is when 0 on the dial is at the pointer 34 and the gears are in neutral. At such time and only at such time, the aforesaid slot 36a and the flexible shaft pin 31 are in registry; and will permit the driver to pull out the knob 32 (Fig. 1) for a short distance along with the flexible shaft 30 and thereby pull the aforesaid pin 31 into the slot 36a.

The pin 31 being then in back of the extension 17a pulls forward the slide 17, releasing the U-member r from the lip 40. The spring 15 then shifts the U-member r out of the path of the cam on the pawl Pr and the pawl then shifts the gears into reverse as soon as the clutch is pushed out.

When through with backing the car, the driver pushes in the knob 32 and the flexible shaft 30 and disengages the pin 31 from the slot 36a and leaves it engaged only with the slot 14a in the shaft 14, whereupon the device again becomes operative for forward driving in the usual way as already explained.

When during reverse, the pin 31 is in both the slot 36a and the slot 14a, the shaft 14 cannot be rotated. At this time the ratchet mechanism 20—24 is automatically prevented from engaging the ratchet teeth o in the shaft by a thin curved shield or cover 41 supported by the slide 17 which pulls forward with the slide and covers the ratchet teeth. Therefore when the clutch is operated to go into reverse, the ratchet 20 slips idly on the shield 41. In the absence of this shield, the ratchet would engage the ratchet teeth of the shaft and would be broken, because the shaft 14 at this time as explained above is locked against rotation.

The U-member r is returned into its normal position as in Fig. 5 by the spring 18 retracting the slide 17 to the right in that figure causing the bevel edge on the lug 40 of said slide to engage the bevel on the adjacent lug of the U-member r, thereby camming it into its normal position shown in Fig. 5, which movement at the same time puts the leaf spring 15 under tension.

Summarizing the operation of the illustrative embodiment:—each push out of the clutch automatically operates the transmission to the next shift in the cyclical series, low, second, high and neutral. The accompanying letting in of the clutch makes said shift immediately effective in the operation of the car; and also operates the step by step mechanism so that it registers the next shift in the cyclical series. The position of the dial automatically indicates the status of the transmission. The hand control can be used at any time to interfere with the aforesaid automatic succession of shifts whereby, for example, the next shifts may be made to successively lower shifts in the cycle instead of to higher shifts as above. Finally the shift into reverse is effected by pulling out the manual control for a short distance while the gears are in neutral and thereby position the reverse pawl to shift the gears into reverse upon the next pushing out of the clutch.

What I claim is:

1. In combination with an automobile transmission, clutch and clutch operating means, gear shifting means operatively related to the transmission and selectively adjustable to effect the different gear-shifts and being itself operated by the clutch operating means through a lost-motion connection so that the first part of the movement of the latter merely releases the clutch, the second part of said movement restores the transmission to neutral and the third part effects the selected gear-shift; and an endless step-by-step operated means which gives the gear-shifting means a cyclical succession of adjustments for effecting gear-shifts from first to second to high to neutral, back to first, to second to high to neutral and so on, said step-by-step means being itself operated one step at a time by the clutch operating means during each letting in of the clutch.

2. In combination with an automobile transmission, clutch and clutch operating means, gear shifting means operatively related to the transmission and selectively adjustable to effect the different gear-shifts and being itself operated by the clutch operating means so that pushing out the clutch effects the selected gear-shift; and an endless step-by-step operated means which gives the gear-shifting means a cyclical succession of adjustments for effecting gear-shifts from first to second to high to neutral, back to first, to second to high to neutral and so on, said step-by-step means being itself operated one step at a time by the clutch operating means during each letting in of the clutch; manual means operating to adjust the gear-shifting means so that pushing out the clutch put the transmission into reverse and at the same time renders temporarily inoperative the aforesaid step-by-step means; and means which prevents the operation of the manual means as aforesaid except when the transmission is in neutral.

3. In combination with an automobile transmission, gear shifters, clutch, and clutch operating means; slides inter-related for reciprocation in opposite directions relative to each other and connected with the clutch operating means to be reciprocated as aforesaid thereby; pawls pivotally supported on the respective slides with their free ends directable towards the gear shifters; and step-by-step mechanism operated by the clutch operating means each time the clutch is let in and comprising a shaft which is given a step-by-step rotation, said shaft having differentiated portions on its sides spaced lengthwise of the shaft, and members in contact with said differentiated portions and operated thereby and severally related to the pawls and selectively determining their operativeness on the gear shifters.

4. In combination with an automobile transmission, gear shifters, clutch and clutch operating means; slides interrelated for reciprocation in opposite directions relative to each other and connected with the clutch operating means to be reciprocated as aforesaid thereby; pawls pivotally supported on the respective slides with their free ends directable towards the gear shifters; and step-by-step mechanism comprising a shaft, a ratchet mechanism operative to give the shaft step-by-step rotation, a cam carried by one of the aforesaid slides arranged to operate the ratchet mechanism to give a partial rotation to the shaft at each letting in of the clutch, differentiated portions on the sides of the shaft spaced lengthwise thereof, and members in contact with said differentiated portions and operated thereby and severally related to the pawls and selectively determining their operativeness on the gear shifters.

5. The device of claim 3 further characterized by an indicator operated by a flexible shaft connection with the first named shaft.

6. The device of claim 3 further characterized by a manually operable Bowden wire connected with the shaft, means operable by said Bowden wire to rotate and lock the shaft in the position in which the transmission gears are in neutral, and means also operable by the Bowden wire to render the step-by-step mechanism inoperative to rotate the shaft and at the same time render one of the pawls operative on its gear shifter to shift the gears into reverse.

7. In combination with an automobile transmission, gear shifters, clutch and clutch operating means; slides having lateral extensions each provided with pawls adjustable to contact directly with either gear shifter, said slides being inter-related for reciprocation simultaneously in opposite directions by the clutch operating means, pawls on the respective slides directable towards the gear shifters, said pawls according to their adjustment being selectively operable directly on the gear shifters, there being a lost motion connection between the clutch operating means and said slides whereby the first part of the movement of the former merely releases the clutch, the second part actuates the slides and through the pawls acts on the gear shifters to restore the transmission to neutral, and the third part of said movement effects a gear shift through a selected pawl; and means for effecting a cyclical progression of gear shifts by automatically adjusting said pawls, itself operated by the clutch operating means during each letting-in of the clutch.

8. In combination with an automobile transmission, gear shifters, clutch and clutch operating means; slides which are inter-related for reciprocation simultaneously in opposite directions by the clutch operating means, pawls on the respective slides directable towards the gear shifters, said pawls according to their adjustment being selectively operable on the gear shifters, there being a lost motion connection between the clutch operating means and said slides whereby the first part of the movement of the former merely releases the clutch, the second part actuates the slides and through the pawls acts on the gear shifters to restore the transmission to neutral, and the third part of said movement effects a gear shift through a selected pawl; and step-by-step mechanism operated by the clutch operating means each time the clutch is let in and comprising a shaft which is given a step-by-step rotation, said shaft having differentiated portions on its sides spaced lengthwise of the shaft, and further comprising members in contact with said differentiated portions and operated thereby and severally related to the pawls and selectively determining their operativeness on the gear shifters.

9. The device of claim 8 further characterized by a manually operable Bowden wire connected with the shaft, means operable by said Bowden wire to rotate and lock the shaft in the position in which the transmission gears are in neutral, and means also operable by the Bowden wire to render the step-by-step mechanism inoperative to rotate the shaft and at the same time render one of the pawls operative on its gear shifter to shift the gears into reverse.

ROBERT HEAD.